United States Patent [19]

Heller et al.

[11] B 3,987,631

[45] Oct. 26, 1976

[54] METHOD AND APPARATUS FOR COOLING HEAT ENGINES

[75] Inventors: László Heller; László Forgó; György Frank, all of Budapest, Hungary

[73] Assignee: Transelektro Magyar Villamossagi Kulkereskedelmi Vallalat, Budapest, Hungary

[22] Filed: Sept. 13, 1974

[21] Appl. No.: 505,689

[44] Published under the second Trial Voluntary Protest Program on March 2, 1976 as document No. B 505,689.

[52] U.S. Cl. .................................. 60/690; 60/39.5; 165/123; 165/DIG. 1; 110/160
[51] Int. Cl.² .................... F02C 7/12; F28F 13/12
[58] Field of Search ............... 165/123, 125, DIG. 1; 261/DIG. 77; 60/686, 685, 690, 39.02, 39.5; 417/155; 110/160

[56] References Cited
UNITED STATES PATENTS

| 3,488,960 | 1/1970 | Kirkpatrick | 60/686 |
| 3,760,869 | 9/1973 | Brown | 261/DIG. 11 |
| 3,846,519 | 11/1974 | Spangemacher | 60/690 |

FOREIGN PATENTS OR APPLICATIONS

| 525,702 | 9/1940 | United Kingdom | 165/DIG. 1 |
| 567,196 | 9/1930 | Germany | 261/DIG. 11 |

Primary Examiner—Carlton R. Croyle
Assistant Examiner—L. Casaregola
Attorney, Agent, or Firm—Young & Thompson

[57] ABSTRACT

A heat engine producing a hot gas is cooled by a fluid which in turn is cooled by the convective updraft of air in a cooling tower. The convective updraft is increased by adding a portion of the hot gas to the air in the cooling tower downstream of the heat exchange between the air and the cooling fluid. The heat engine may be an internal combustion engine of the gas turbine or piston type or a compressor or the like, and the hot gas may be product or exhaust.

5 Claims, 4 Drawing Figures

METHOD AND APPARATUS FOR COOLING HEAT ENGINES

The present invention relates to a method and apparatus for the cooling of a heat engine such as an internal combustion engine of the gas turbine or reciprocating piston type or a compressor or the like, characterized in that the engine produces a hot gas either as product or as exhaust.

It is well known that during the continuous operation of internal combustion engines and machines driven thereby, the moving parts of the engines and often the operating medium flowing through the engine must be cooled. The heat to be removed can thus be formed by the friction of the moving parts and/or thermodynamically.

For example, in the case of an air compressor driven by a gas turbine, which will be hereinafter illustrated as one of the many environments in which the present invention can be practiced, it is often necessary to cool the lubricating oil that flows in the bearings, and to cool the interstage gases of the turbine and the interstage gases of the compressor. This is done by heat exchange with a liquid or gaseous cooling medium.

It is known to use the natural draft of a cooling tower for cooling such medium or to induce flow of the cooling medium itself. The heat exchange may take place directly in the tower itself, or an intermediate heat exchange fluid such as water or other liquid may circulate between the heat engine and the cooling tower. However, such cooling tends to be inadequate, due to the relatively weak draft of cooling towers as provided heretofore.

Accordingly, it is an object of the present invention to provide methods and apparatus for cooling heat engines, which will be characterized by increased heat transfer from the heat engine to be cooled.

Another object of the present invention is to provide such a method, which will be relatively simple and easy to practice with a minimum of supervision, and to provide such apparatus which will be relatively inexpensive to construct, easy to operate, maintain and repair, and rugged and durable in use.

Another objects, features and advantages of the present invention will become apparent from a consideration of the following description, taken in connection with the accompanying drawings, in which.

Figure 1:
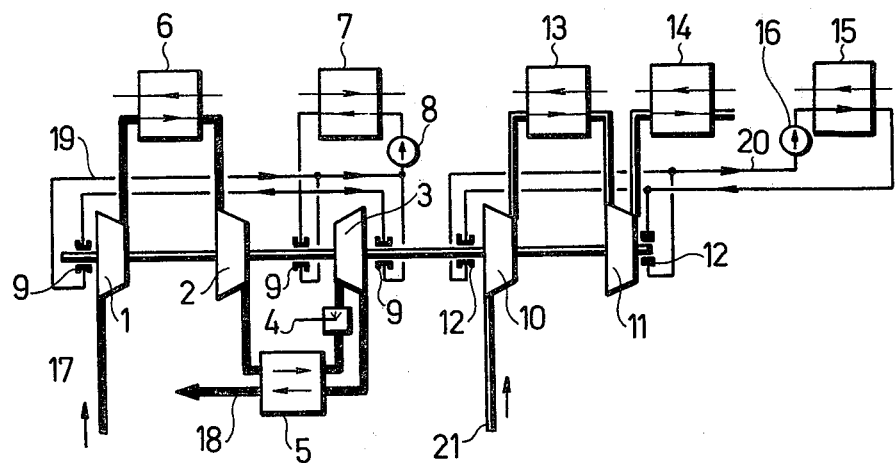
FIG. 1 is a schematic view of a compressor driven by a gas turbine, showing the cooling means for the bearings and flowing gases.

Referring now to the drawings in great detail, and first to FIG. 1, there is shown a known heat engine of a type usable in connection with the present invention, comprising a compressor driven by a gas turbine. Air enters the turbine at 17 and passes to the low pressure compression stage 1 and thence to the high pressure compression stage 2 via heat exchanger 6, and thence via heat exchanger 5 through the combustion chamber 4 to the driving or expansion stage 3 of the turbine, and thence out through exchanger 5 in the form of exhaust gas 18. Hydrocarbon fuel is supplied to the combustion chamber 4.

On the compressor side, gaseous medium such as air to be compressed enters at 21 and passes through the low pressure compression stage 10 and thence through heat exchanger 13 to the high pressure compression stage 11 and thence to the aftercooler in the form of a heat exchanger 14.

The bearings 9 of the turbine are lubricated with lubricating oil which becomes heated and is cooled by oil flowing in a closed circuit 19 under the impetus of a pump 8. The oil is cooled in a heat exchanger 7.

The bearings 12 of the compressor are likewise lubricated with lubricating oil, which oil flows in a closed circuit 20 under the impetus of pump 16 and is cooled in heat exchanger 15.

In the illustrated embodiment, therefore, gas coolers 6, 13 and 14 are provided, as well as oil coolers 7 and 15. The situation is similar in the case of a compressor driven not by a gas turbine but rather by a diesel engine. However, in that latter case, one would also cool the cylinders of the diesel engine.

Water or air is usually used as the cooling medium that flows through the coolers by means of suitable pumps (not shown) in the case of water, or fans (not shown) in the case of air.

Figure 2:
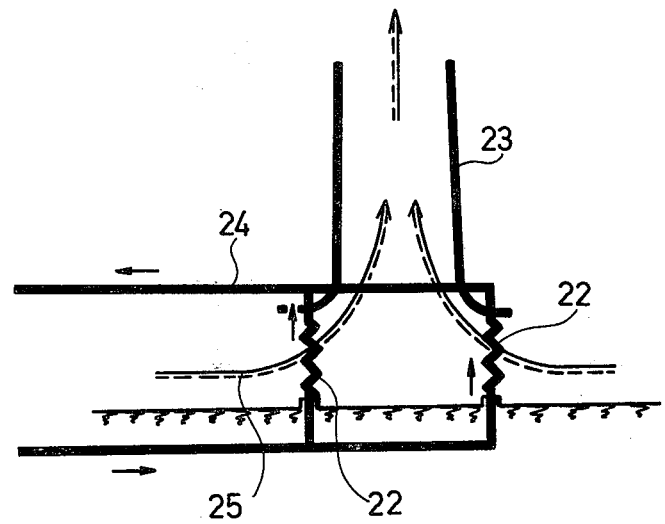
FIG. 2 is a schematic view of a known type of cooling tower for heat engines.

It is also known to provide the necessary cooling by means of a natural draft cooling tower having heat exchangers 22 and a vertical flue 23, as shown in FIG. 2. The fluid medium 24 flowing through exchangers 22 yields its heat to atmospheric air 25 flowing through the heat exchangers 22 and thence up through the flue by the natural convection or updraft of the heated air.

It will be understood that the exchangers 22 may be the exchangers 6, 7, 13, 14 and 15 themselves, or may be in more remote locations and connected with the exchangers 22 by suitable conduits.

As pointed out above, the natural convective updraft of cooling towers known thus far, is not as strong as would be desirable. At the same time, it is often true that a great deal of heat is discharged to the atmosphere in an undesirable manner, through the exhaust of heat engines; and this amount of heat may be quite large compared to the heat which is removed through cooling.

The present invention overcomes these difficulties of the prior art, by utilizing at least a portion of the hot gas produced by the heat engine, to augment the updraft of the cooling tower. Specifically, at least a portion of the hot gas from the heat engine, which may be exhaust in the case of an internal combustion engine or product in the case of a compressor, is introduced into the cooling tower downstream from the heat exchangers in the tower, so that the temperature of the gases rising in the tower is increased and their volume correspondingly decreased, with concomitant increase in their upward flow rate.

Figure 3:
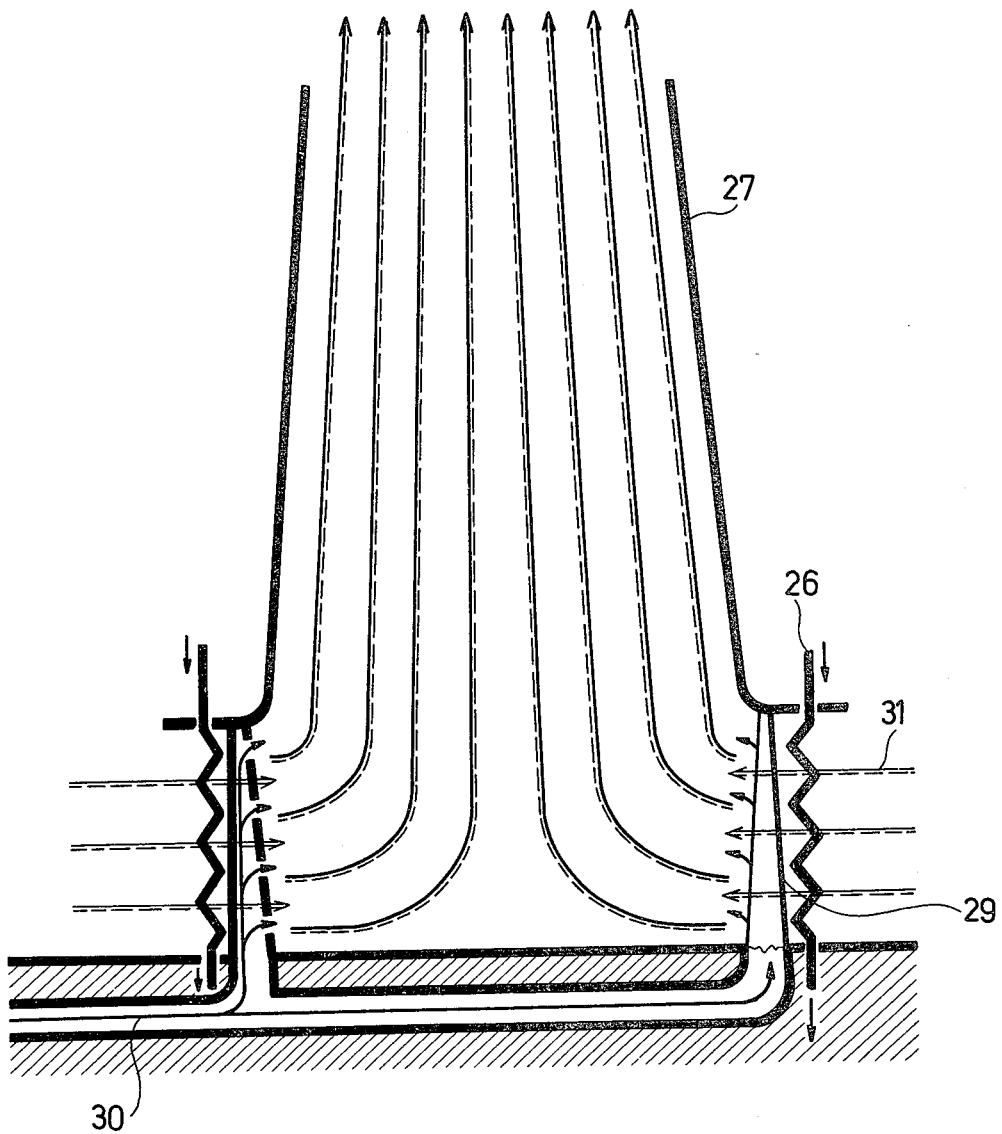
FIG. 3 is a view similar to FIG. 2 but showing a first embodiment of the present invention.

In the first embodiment of the invention shown in FIG. 3, the heat exchangers 26 are located in the lower portion of the cooling tower, and air flows through the heat exchangers as indicated at 31, and then up into the flue 27. As indicated, the exchangers 26 can either be the exchangers 6, 7, 13, 14 and 15 of FIG. 1, or may be in fluid communication with those exchangers.

Downstream of exchangers 26, with respect to the direction of air flow into the tower, is disposed a distribution device 29 for hot gas 30 from the heat engine. To this end, the device 29 comprises a number of upright conduits disposed in a circular series about the base of the cooling tower, immediately downstream of exchangers 26, these upright conduits having a series of outlets along their sides facing the interior of the cooling tower, for the discharge of the hot gas 30 therethrough and into the tower. The air flows between the exchangers 26 and between the upright conduits of the device 29, and mixes with the hot gases and then flows upwardly through flue 27 with augmented draft. The device 29 thus not only distributes the hot gas but also serves to aid in admixing it with the air. However, it should be noted that the flue gas discharged from distributor 29 has a relatively low flow rate and so does not exert any substantial ejector effect on the incoming air. Instead, the flow of the air is augmented by convective updraft, and not by ejection.

Figure 4:
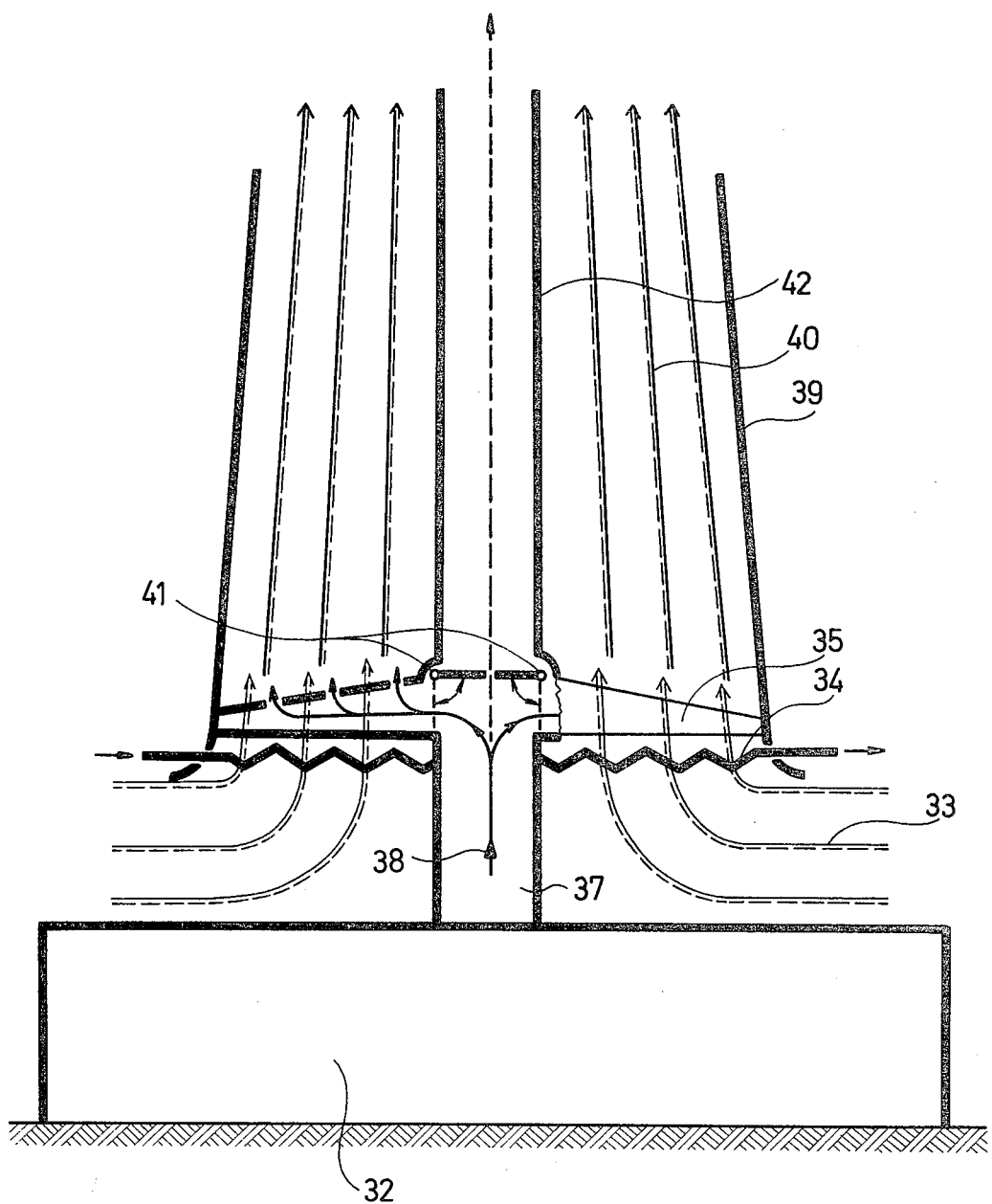
FIG. 4 is a view similar to FIG. 3 but showing a second embodiment of the invention.

A second embodiment of cooling tower for use with the present invention is shown in FIG. 4, mounted atop a housing 32 which may contain the heat engine itself. A heat exchanger 34 comprises or communicates with the heat exchangers for the heat engine and is located at the bottom of the flue 39 of the tower. Directly above the heat exchanger 34 is a distributor 35 having a plurality of radial arms having plural openings along their upper sides, for distributing a hot gas 38 from the heat engine over the entire cross section of the tower, the hot gas passing from the heat engine to distributor 35 via a conduit 37. The flue is thus traversed upwardly by a mixture 40 of hot gas and cooling air.

Centrally of the flue 39 is a chimney 42 communicating downwardly with the distributor 35. At the base of the chimney is a louver 41 which swings vertically to open or close the chimney, thereby selectively permitting hot gas rising through conduit 37 to pass directly up through the chimney 42 without admixture with the air, or to close the bottom of the chimney so that the hot gas all admixes with the air. Of course, intermediate positions of the louver 41 will selectively regulate the quantity of hot gas that admixes with the air in flue 39, thereby to regulate the updraft as desired.

By the practice of the present invention, therefore, it is possible to provide smaller cooling towers and/or less heat exchanger surface. It is also possible to discharge hot gases into the atmosphere already admixed with air and reduced in temperature, in the manner of a chimney, thereby reducing the thermal and chemical pollutant effect of such gases.

From a consideration of the foregoing disclosure, therefore, it will be seen that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. In combination with a heat engine producing a hot gas and having at least one fluid flowing to cool the engine, a cooling tower for the upward convective flow therein of air, an indirect heat exchanger adjacent the base of the tower for cooling said fluid by the flow of air past said heat exchanger in indirect heat exchange with said fluid and up through said tower, and means for introducing into said tower at least a portion of said hot gas thereby to augment the upward convective flow of air through said tower, said introducing means comprising conduit means located immediately downstream of said heat exchanger with respect to the direction of air flow past said heat exchanger, said conduit means extending across the path of said air transversely of the direction of said air flow, said conduit means having a plurality of outlets spaced apart in said transverse direction and facing in said downstream direction.

2. Apparatus as claimed in claim 1, and means for selectively regulating the quantity of hot gas introduced into said tower.

3. Apparatus as claimed in claim 2, said regulating means comprising a central chimney in said tower and louver means at the base of the chimney for proportioning said hot gas between said conduit means and said chimney.

4. Apparatus as claimed in claim 1, and heat exchange fluid flowing through said heat engine and passing in indirect heat exchange with said fluid in said heat exchanger.

5. A method for cooling a heat engine that produces a hot gas, comprising circulating a heat exchange medium in heat exchange relationship with the heat engine, cooling said medium by indirect heat exchange with air flowing upwardly by convection in a cooling tower, and augmenting the upward flow of air in the tower by introducing into the tower at least a portion of said hot gas immediately downstream of the region in which said medium is heat exchanged with said air and from a plurality of outlets that are spaced apart across the cross section of said tower in a direction transverse to the direction of air flow at the point where said air and hot gas meet.

* * * * *